July 17, 1956     O. F. GILDER     2,754,652
SELF-PROPELLED BALER VEHICLE

Filed Jan. 19, 1953     4 Sheets-Sheet 1

INVENTOR.
Oren F. Gilder
BY
ATTORNEY

July 17, 1956  O. F. GILDER  2,754,652
SELF-PROPELLED BALER VEHICLE
Filed Jan. 19, 1953  4 Sheets-Sheet 2

INVENTOR.
Oren F. Gilder
BY
ATTORNEY

July 17, 1956

O. F. GILDER 2,754,652

SELF-PROPELLED BALER VEHICLE

Filed Jan. 19, 1953

INVENTOR.
Oren F. Gilder
BY

ATTORNEY

July 17, 1956  O. F. GILDER  2,754,652
SELF-PROPELLED BALER VEHICLE
Filed Jan. 19, 1953  4 Sheets-Sheet 4

INVENTOR.
Oren F. Gilder
BY
ATTORNEY

United States Patent Office 2,754,652
Patented July 17, 1956

2,754,652

SELF-PROPELLED BALER VEHICLE

Oren F. Gilder, near Delta, Colo.

Application January 19, 1953, Serial No. 331,847

3 Claims. (Cl. 56—341)

This invention relates to implements of the class known as "pick-up hay balers" designed to gather, compress, tie, and redeposit grass crops as a consequence of implement power actuation coincidental with implement translation through the field of crop growth, and has as an object to provide a novel and improved organization of such an implement in and as a steerable self-propelled unit.

A further object of the invention is to provide a novel and improved combination of a steerable, self-propelled vehicle mount in operative supporting and translating relation with a conventional powered hay baler of pick-up type.

A further object of the invention is to provide a novel and improved steerable, self-propelled vehicle adapted for the operative support and translation of a conventional powered hay baler unit of pick-up type.

A further object of the invention is to provide a novel and improved unitary association of elements constituting a steerable, self-propelled vehicle for the operative support and translation of a conventional powered hay baler unit of pick-up type.

A further object of the invention is to provide a vehicle facility coactible with a conventional pick-up type hay baler to mount and condition the latter for steerable self-propulsion, which facility is simple and economical of production, readily adaptable to its intended use with hay baler units of various particular forms and constructions, convenient of practical operation by a single operator, positive and efficient in attainment of the ends for which designed, and employable to simplify and expedite the harvesting and processing operations characteristic of pick-up hay balers.

With the foregoing and other objects in view, my invention consists in the construction, arrangement, and combination of elements as hereinafter set forth, pointed out in my claims, and illustrated by the accompanying drawings, in which—

Wheeled, translatable implements power-operable to gather and bale mown grass crops, such as hay, as the implement is moved through the field of crop growth are well-known and extensively in use. Such implements, in a variety of particular styles and constructions, are characterized by a relatively narrow, elongated, baler unit assembly 10 typified by a rigid box or frame structure disposed at one side of the implement to parallel the implement path of travel, a pick-up unit 11 fixedly related with and to outstand laterally from one side of an intermediate length portion of the assembly 10 with its lower margin disposed to sweep over and closely adjacent the ground surface and into elevating engagement with the crop elements to be harvested as the implement is advanced over said surface, a feed unit 12 operatively correlated with the baler assembly 10 and pick-up 11 to charge the crop elements gathered by the latter into the said assembly, and power means, such as an internal combustion engine 13 carried by and above the assembly 10, or the equivalent, in driving relation with the operating elements of the organization. Furnished with suitable supporting wheels in a conventional arrangement other than that illustrated and linked in towed, or in towed and simultaneously powered, relation with a steerable, self-propelled vehicle, such as a tractor, implements constituted as shown and described are operable to gather, bale, tie, and eject as tied bales the mowed, and usually windrowed, grass crop elements against which the pick-up unit 11 is caused to advance, all in accord with known and widely-utilized practice. An economic and operative disadvantage of material consequence in the practical use of conventional pick-up hay balers derives from production of the implements in form and style requiring their association for operation wtih a towing vehicle instead of in form for steerable self-propulsion; it being manifest that an operator is necessary for the towing vehicle as well as a second operator to tend the functioning of the harvesting implement, and that the tandem tow unit is much more difficult to maneuver, and much slower of efficient traverse, in and about a field than is a single, steerable, self-propelled unit. Corrective of the disadvantages above noted and retentive of the operative merits of conventional such implements, the instant invention is directed to the provision of a steerable, self-propelled vehicle adapted to mount, operatively position, and translate a conventional pick-up hay baler in and as the harvesting component of a unit arranged for manipulation and control by a single operator.

Figure 1:
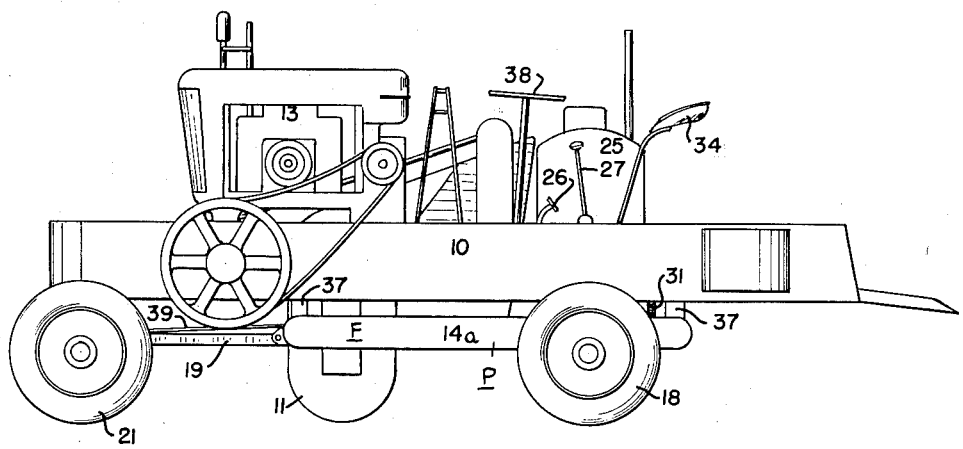
Figure 1 is a side elevation of a pick-up baler and vehicle combination exemplifying the principles of the invention as organized ready for practical use.
Figure 2:
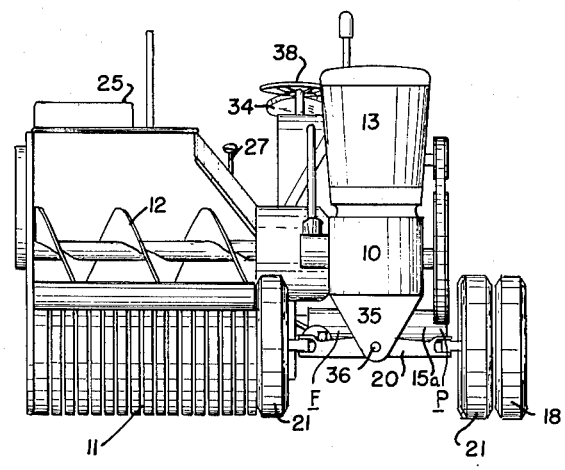
Figure 2 is a front end elevation of the assembly shown in Figure 1.
Figure 3:
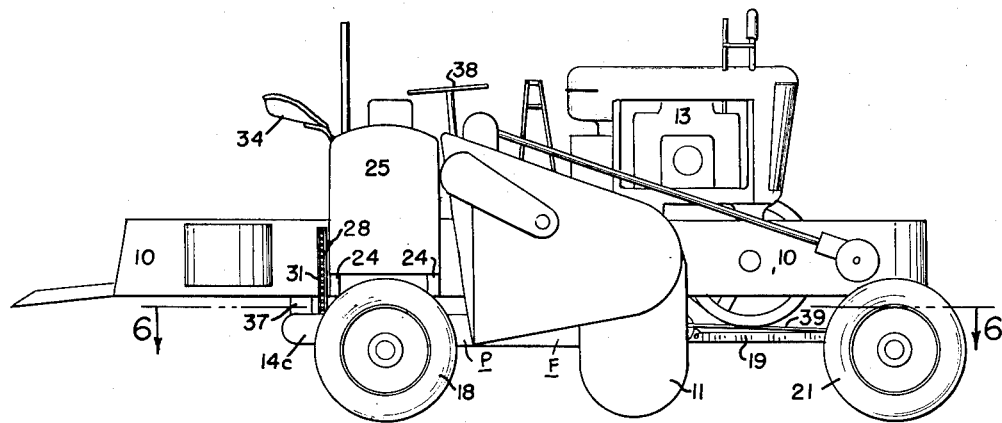
Figure 3 is an elevation of the side of the assembly opposite to that shown in Figure 1.
Figure 4:
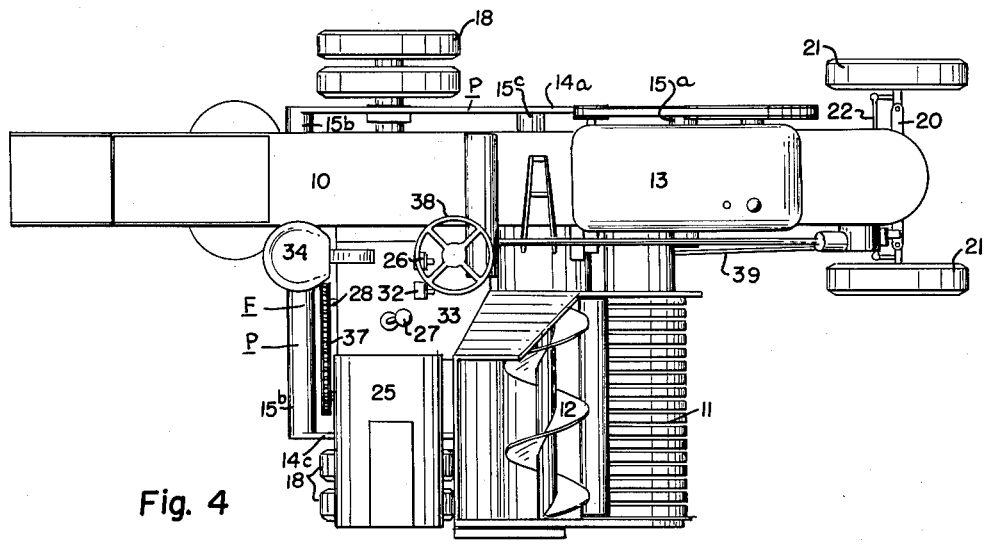
Figure 4 is a top plan view of the assembly represented by the preceding views.
Figures 5, 6:
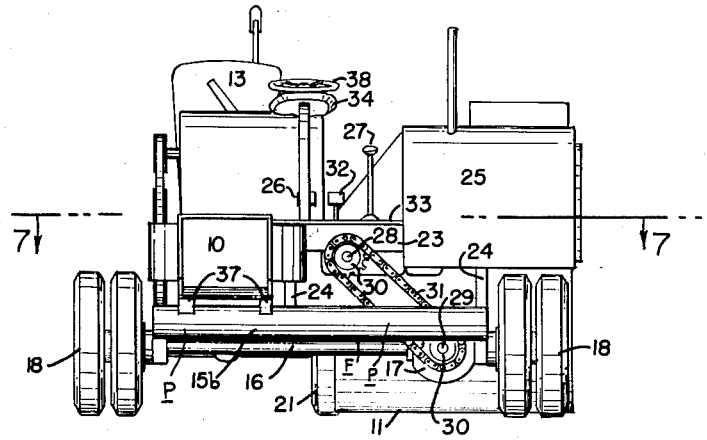
Figure 5 is a rear end elevation of the assembly shown in the preceding views.
Figure 6 is a transverse, horizontal section through the illustrated assembly taken substantially on the indicated line 6—6 of Figure 3.
Figure 7:
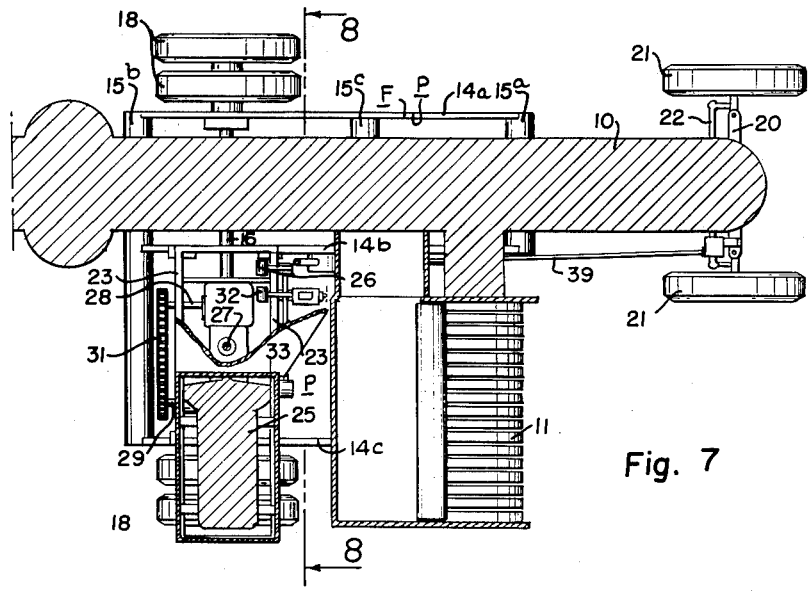
Figure 7 is a section similar to Figure 6 taken substantially on the indicated line 7—7 of Figure 5, certain elements being broken away to illustrate otherwise concealed arrangements.
Figure 8:
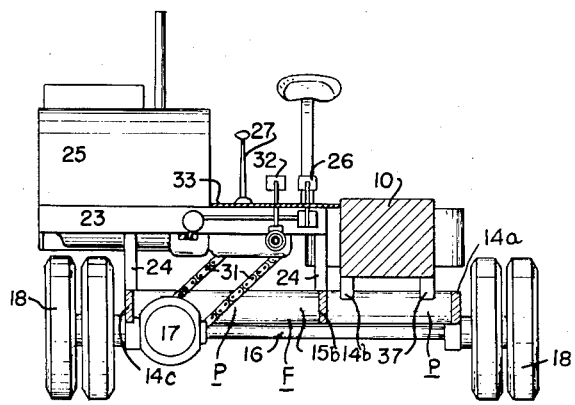
Figure 8 is a transverse, vertical section taken substantially on the indicated line 8—8 of Figure 7.

Giving effect to the principles of the invention, a main frame F is constituted from spacedly-parallel, rigid, longitudinal members 14 and spacedly-parallel, rigid, transverse members 15 perpendicularly interrelated and rigidly interconnected as best shown in Figure 6 to comprise a coplanar unit. In an arrangement found to be practical in use, three tubular transverse members 15a, 15b and 15c and three flat longitudinal members 14a, 14b and 14c are associated and interwelded, as at W, Figure 6, at their mutual intersections to define a generally-rectangular, corner-notcher main frame F characterized by a relatively-longer, rectangular side portion P framed by two of the members 14a and 14b interlinked at their ends by a longer and a shorter member 15a and 15b in a width appropriate to engage under and mount the baler unit assembly 10 and an associated shorter and relatively-wider, rectangular side portion p outstanding laterally from said longer side portion P a distance less than the extension of the pick-up unit 11 laterally from the said baler assembly 10, said shorter and wider side portion p being framed in the angle between the longer member 15b and one of the associated members 14b of the narrower side portion P by means of a duplicate member 15c spacedly paralleling said first such longer member 15b in bridging relation across the narrower side portion P of the frame F and a shorter member 14c interlinking the otherwise free ends of said duplicate members 15b and 15c in outwardly-spaced parallelism with the adjacent member 14b of the narrower frame portion P. As so constituted, the main frame F is mounted on and supported for translation by a drive axle 16 including a conventional differential 17 and furnished with traction wheels 18 at its ends exteriorly adjacent the outer frame members 14a and 14c, which axle is disposed laterally of and beneath the said main frame F across both the narrower and wider side portions P and p thereof somewhat inwardly from the frame member 15b common to both of said side portions, thus to present the free end of the frame narrower side portion P as the frame element leading in the direction of vehicle forward travel.

Hinged at its apex to the midlength of the shorter member 15a closing the free end of the main frame narrower side portion P, a V-shaped drag link 19 diverges forwardly thence in substantially the same plane with the main frame F to engagement of its spaced forward ends with an end-yoked axle 20 paralleling the axle 16, and the spindle knuckles of steerable wheels 21 are hinged in the yoked ends of said axle and interlinked, as at 22, in a usual manner to dirigibly support said axle for translation with the so-associated main frame when operatively coupled to the latter through connection to the baler unit assembly 10 secured thereto.

Fixedly carried by and in spaced parallel relation above a rearward portion of the main frame F comprised from the members 14 and 15, a rigid, rectangular, supplementary frame 23 is supported, as by means of struts 24, in a size and disposition to align longitudinally with and above the axle 16 in bridging relation laterally of the main frame wider side portion p from the member 14b common to the wider and narrower frame side portions p and P over and beyond the outer member 14c of said wider side portion, whereby to position the free outer end of said supplementary frame in spaced, overhanging relation with the traction wheels 18 at the corresponding side of the assembly. The supplementary frame 23 functions as the mount for a prime mover, such as an internal combustion engine 25, thereon disposed in operative correlation with the customary adjuncts and facilities for output of power through the usual clutch and transmission, represented by their respective controls 26 and 27 located for convenience of operator access adjacent the inner end of the frame 23, to drive a shaft 28 paralleling the direction of vehicle travel under typically automotive operator control. The shaft 28 extends rearwardly beyond the frame 23 in spaced parallelism with a power input shaft 29 serving the differential 17 in a usual manner, and like sprockets 30 fixed in coplanar relation to the ends of said shafts 28 and 29 are intercoupled by an endless chain 31 wherethrough the power output of the shaft 28 is applied to drive the axle elements and wheels 18 of the assembly, all in an obvious manner. Brake means represented by the conventional control 32 are provided in any appropriate arrangement for regulating the advance of the vehicle. The inward end of the supplementary frame 23 is expediently decked over, as at 33, and a seat 34 is supported from said deck and frame to appropriately position an operator with relation to the pertinent controls and to face forwardly in the direction of vehicle travel.

Constructed and assembled as shown and described, the wheeled vehicle is conditioned for supporting association with a conventional pick-up hay baler in such manner as to complete a steerable, self-propelled, pick-up hay baler assembly susceptible of manipulation and control by a single operator. To effect the desired combination, the wheel support characterizing the conventional baler unit is removed and a mounting web 35 is supplied, if not already present in the equivalent form, to depend from fixed, transverse relation with the under surface of the baler assembly 10 forward end in position to embrace or overlie the midpoint of the axle 20 and to connect at its lower end with said axle by means of a hinged pin 36 engaged therethrough in alignment with the direction of vehicle travel. With the said web 35 in place on the unwheeled baler unit, said unit is mounted upon and secured to the main frame F of the vehicle substantially as illustrated, the assembly 10 of said unit being superposed upon and in longitudinal alignment with the narrower side portion P of the vehicle main frame in such extension at each end therebeyond as serves to appropriately engage the web 35 with the axle 20 and to dispose the assembly 10 delivery end in trailing relation with the main frame F, in which correlation of elements the power unit 13 is supported rearwardly adjacent the front truck of the vehicle and the laterally-extending pick-up unit 11 with its feed unit 12 is accommodated in position of practical use ahead of the supplementary frame 23 and main frame wider side portion p at one side of the front truck travel path. Appropriately correlated with and on its vehicle mount, the baler assembly is thereto securely attached, as by means of struts 37 interlinking rigid elements, not shown, of the baler assembly and members of the main vehicle frame F, and steering means, such as a wheel 38 conveniently related with the operator's seat 34 and a linkage 39 connecting said wheel to and for actuation of the link 22 and steerable wheels 21 of the front truck, is operatively coupled to complete organization of the ultimate assembly, ready for operation.

Operation, use, and practical advantage of the improvement should be readily apparent from the foregoing. Mounted on and associated with the steerable, self-propelled vehicle powered by the engine 25, the pick-up baler assembly functions in its usual manner and as powered by its independent engine 13 to gather, bale, tie, and deliver tied bales of the mowed grass crop against which the vehicle is directed and advanced under control of an operator so located as to supervise, adjust and regulate the functioning of the baler assembly, and particularly the bale-typing mechanism thereof.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A vehicle for the dirigibly propulsive, operative support of a powered pick-up hay baler having a narrow, elongated baler assembly characterized by operating elements, a pick-up unit characterized by operating elements fixedly related with and outstanding laterally from one side of said baler assembly between the ends of and in feeding relation with the latter, and power means carried by said baler assembly in driving relation with the operating elements of said pick-up unit and baler assembly, said vehicle comprising a rigid frame formed with a narrow, elongated side portion adapted to fixedly engage with and under the baler assembly for support of the latter in projection at each end beyond the frame and with a relatively shorter and wider side portion aligned at its trailing end with and extending laterally from one side of said narrower side portion adapted to engage with and behind the pick-up unit associated with the baler assembly, an axle hingedly linked to and in leading relation with the forward end of said narrow frame side portion transversely beneath the forward projection of the mounted baler assembly, steerable wheels supporting the ends of said axle, a web fixedly depending from the forward projection of the baler assembly to hinge connection with the midpoint of said axle, whereby to steerably support the forward end of the frame through the mounted baler assembly, a wheeled propulsive axle transversely of, beneath, and in supporting relation with the aligned rearward ends of the narrower and wider side portions of said frame, a prime mover mounted on the wider side portion of the frame, and driving connections between said prime mover and said propulsive axle.

2. A vehicle for the dirigibly propulsive, operative support of a powered pick-up hay baler having a narrow, elongated baler assembly characterized by operating elements, a pick-up unit characterized by operating elements fixedly related with and outstanding laterally from one side of said baler assembly between the ends of and in feeding relation with the latter, and power means carried by said baler assembly in driving relation with the operating elements of said pick-up unit and baler assembly, said vehicle comprising a rigid frame formed with a narrow, elongated side portion adapted to fixedly engage with and under the baler assembly for support of the latter in projection at each end beyond the frame and with a relatively shorter and wider side portion aligned at its trailing end with and extending laterally from one side of said narrower side portion adapted to engage with and behind the pick-up unit associated with the baler assembly, an axle hingedly linked to and in leading relation with the forward end of said narrow frame side portion transversely beneath the forward projection of the mounted baler assembly, steerable wheels supporting the ends of said axle, a web fixedly depending from the forward projection of the baler assembly to hinge connection with the midpoint of said axle, whereby to steerably support the forward end of the frame through the mounted baler assembly, a wheeled propulsive axle transversely of, beneath, and in supporting relation with the aligned rearward ends of the narrower and wider side portions of said frame, a supplementary frame fixed parallel to and spacedly above the wider side portion of the first frame in overhanging relation at its outer end with the propulsive wheels adjacent said wider side portion, a prime mover mounted on said supplementary frame, and driving connections between said prime mover and said propulsive axle.

3. A vehicle for the dirigibly propulsive, operative support of a powered pick-up hay baler having a narrow, elongated baler assembly characterized by operating elements, a pick-up unit characterized by operating elements fixedly related with and oustanding laterally from one side of said baler assembly between the ends of and in feeding relation with the latter, and power means carried by said baler assembly in driving relation with the operating elements of said pick-up unit and baler assembly, said vehicle comprising a rigid frame formed with a narrow, elongated side portion adapted to fixedly engage with and under the baler assembly for support of the latter in projection at each end beyond the frame and with a relatively shorter and wider side portion aligned at its trailing end with and extending laterally from one side of said narrower side portion adapted to engage with and behind the pick-up unit associated with the baler assembly, an axle hingedly linked to and in leading relation with the forward end of said narrow frame side portion transversely beneath the forward projection of the mounted baler assembly, steerable wheels supporting the ends of said axle, a web fixedly depending from the forward projection of the baler assembly to hinge connection with the midpoint of said axle, whereby to steerably support the forward end of the frame through the mounted baler assembly, a wheeled propulsive axle transversely of, beneath, and in supporting relation with the aligned rearward ends of the narrower and wider side portions of said frame, a supplementary frame fixed parallel to and spacedly above the wider side portion of the first frame in overhanging relation at its outer end with the propulsive wheels adjacent said wider side portion, a prime mover mounted on said supplementary frame in spaced relation laterally and outwardly from the mounted baler assembly, driving connections between said prime mover and said propulsive axle, a deck covering the area of said supplementary frame between said prime mover and the baler assembly, an operator's seat supported from said deck, and controls for said prime mover, driving connections, and steerable wheels supported by said deck within convenient reach of an operator in said seat.

References Cited in the file of this patent
UNITED STATES PATENTS

| | | |
|---|---|---|
| 1,212,044 | Gaddis | Jan. 9, 1917 |
| 1,495,276 | Theobald | May 27, 1924 |
| 1,496,364 | Bonnafoux | June 3, 1924 |
| 1,639,402 | Erickson | Aug. 16, 1927 |
| 2,292,779 | Barker | Aug. 11, 1942 |
| 2,431,828 | Raney | Dec. 2, 1947 |
| 2,446,878 | Kaupke et al. | Aug. 10, 1948 |
| 2,674,839 | Russell | Apr. 13, 1954 |